United States Patent Office 3,396,121
Patented Aug. 6, 1968

---

3,396,121
COMPOSITIONS CONTAINING CITRIC ACID ESTERS AND THEIR PREPARATION
Johannes Miksch, Mannheim-Pfingstberg, and Lieselotte Bauer, Frankeneck, Pfalz, Germany, assignors to Joh. A. Benckiser GmbH Chemische Fabrik, Ludwigshafen (Rhine), Germany, a corporation of Germany
No Drawing. Continuation-in-part of application Ser. No. 152,040, Nov. 13, 1961. This application Mar. 4, 1964, Ser. No. 349,472
Claims priority, application Germany, Nov. 16, 1960, B 60,102, B 60,103; Mar. 7, 1961, B 61,558, B 61,559
14 Claims. (Cl. 252—312)

This application is a continuation-in-part of copending application Serial No. 152,040, filed November 13, 1961, now abandoned, and entitled "Citric Acid Esters and Processes of Making and Using Same."

The present invention relates to new and valuable compositions containing citric acid esters and more particularly to compositions containing branched-chain citric acid mono- and/or di-esters, and to the preparation of such compositions.

Citric acid esters are extensively used in industry. Frequently it is desired to employ such esters in the form of aqueous emulsions or dispersions. Known emulsifiers or dispersing agents, however, do not permit the preparation of stable emulsions of citric acid esters in water which can be stored for a relatively long period of time because such emulsions or dispersions are subject to de-emulsification after a rather short period of time.

It is one object of the present invention to provide aqueous emulsions or dispersions of citric acid esters in water which are stable for a prolonged period of time.

A further object of the present invention is to provide a process of preparing such stable emulsions or dispersions.

Other objects of the present invention and advantageous features thereof will become apparent as the decription proceeds.

In principle, the process of preparing stable aqueous solutions of emulsifiable compounds and specially of emulsifiable citric acid esters according to the present invention consists in using, as emulsifying and dispersing agent an ester compound of citric acid selected from the group consisting of the mono-esters of citric acid with branched-chain alcohols with at least 9 carbon atoms, the di-esters of citric acid with branched-chain alcohols with at least 9 carbon atoms, and their reaction products with inorganic and organic salt-forming compounds. The new and valuable citric acid esters which are used as emulsifying and dispersing agents according to the present invention are obtained by esterifying citric acids with branched-chain alcohols having at least 9 carbon atoms. The mono- and/or di-esters obtained in this manner represent, either as such or in the form of their reaction products with inorganic or organic salt-forming compounds or, respectively, in mixtures with each other or such salts, excellent emulsifying agents, especially for other citric acid esters. Thus, for the first time, a fully reliable emulsifying or dispersing agent for producing aqueous emulsions or dispersions of citric acid esters has been supplied to the art.

The new citric acid esters according to the present invention are prepared by esterifying citric acid with alcohols having at least 9 carbon atoms or by reesterifying citric acid esters with lower alcohols by reaction with alcohols having at least 9 carbon atoms, whereby at least one carboxyl group of the citric acid remains unesterified. The resulting acid esters or ester mixtures can be converted into their ester salts by reaction with inorganic or organic salt-forming compounds. Thereby, all the free carboxyl groups or only part thereof can be reacted to form the new ester salts.

Inorganic salt-forming compounds are, for instance, hydrazine, hydroxylamine, ammonia, alkali metal hydroxides, and the like. Organic salt-forming compounds are, for instance, ammonia substituted by organic radicals such as organic amines, for instance, triethanolamine, polyamines, or long-chain aliphatic amines, and others. Especially suitable for the purpose of the present invention are amines which have specific properties rendering them suitable for various purposes, for instance, amines having fungicidal, bactericidal, and the like activity such as the organic hydrazines, hydroxy quinoline compounds, hydroxy quinaldine compounds, and the like.

To convert the citric acid esters to be emulsified into aqueous emulsions or, respectively, dispersions, the new branched-chain citric acid ester or its salt-like compound or mixtures thereof are mixed with the citric acid ester to be emulsified and the mixture is then emulsified by means of conventional emulsifiers, for instance, of the whipper, homogenizer, and the like type. Between about 2% and about 50% of said branched-chain citric acid esters and/or their salt-like compounds and preferably between about 5% and about 20% thereof are added. For instance, 5 g. of acetyl tributyl citrate to which 2 g. of di-isotridecyl citrate have been added, can readily be emulsified with 100 cc. of water by means of an emulsifying apparatus within three minutes, whereby a highly stable aqueous emulsion is obtained. Of course, it is also possible to produce more concentrated, highly stable emulsions which can be stored for several months and can be shipped without de-emulsification. Such concentrated emulsions need only be diluted by the addition of water.

The compositions containing such citric acid esters may also be used for improving the tensile strength and the feel of textiles impregnated with resins. They are preferably added during impregnation.

The following examples serve to illustrate the present invention without, however, limiting the same thereto.

Example 1

(a) *Preparation of di-isotridecyl citrate.*—1.92 g. (1 mole) of anhydrous citric acid and 200 g. (1 mole) of isotridecyl alcohol are heated under reflux in an oil bath to a temperature of 170–180° C. for 8 hours. The reaction mixture is poured into water and stirred. The ester which is insoluble in water is separated and dried in a vacuum at 100° C. Yield: 90%. Saponification number: 304 (theoretical value: 303). Acid number: 101 (theoretical value: 101).

(b) *Use of di-isotridecyl citrate as emulsifier.*—90 g. of acetyl tributyl citrate, 9 g. of di-isotridecyl citrate, 1 g. of the sodium salt of di-isotridecyl citrate, and 50 g. of water are emulsified in an emulsifying apparatus for three minutes. The resulting highly stable emulsion can be diluted with any amount of water without de-emulsification.

*Production of the sodium salt of di-isotridecyl citrate.*—50 g. of di-isotridecyl citrate are suspended in a small amount of water; a concentrated solution of 3.6 g. of sodium hydroxide in water is added drop by drop thereto. After removing the water, the ester salt is dried in a vacuum.

Or:

To 50 g. of di-isotridecyl citrate, suspended in a small amount of water, there is added drop by drop a concentrated solution of 7.6 g. of sodium bicarbonate while stirring. After removing the water, the ester salt is dried in a vacuum.

(c) 50 g. of tributyl citrate, 18 g. of di-isotridecyl citrate, 2 g. of the sodium salt of di-isotridecyl citrate, and 50 g. of water are emulsified in an emulsifying apparatus for three minutes. The resulting concentrated emulsion is very stable and can be diluted with water to any desired amount without de-emulsification.

(d) 1 g. of acetyl tributyl citrate, 0.4 g. of di-isotridecyl citrate, and 200 cc. of water are emulsified in an emulsifying apparatus for three minutes. The resulting emulsion is stable for several days.

(e) 50 g. of acetyl tributyl citrate, 9 g. of di-isotridecyl citrate, 1 g. of the methyl glucamine salt of the di-isotridecyl citrate, and 50 cc. of water are emulsified in an emulsifying apparatus for three minutes. The concentrated emulsion can be diluted with any amount of water. A stable emulsion is obtained.

Preparation of the methyl glucamine salt of the di-isotridecyl citrate.—50 g. of di-isotridecyl citrate are suspended in a small amount of water and 17.5 g. of a concentrated solution of methyl gulcamine in water are added slowly drop by drop. After removing the water, the ester salt is dried in a vacuum.

(f) 50 g. of acetyl tributyl citrate, 18 g. of di-isotridecyl citrate, 2 g. of the glucosamine salt of the di-isotridecyl citrate, and 50 g. of water are emulsified in an emulsifying apparatus for three minutes. The obtained stable emulsion can be diluted with any amount of water.

Preparation of the glucosamine salt of di-isotridecyl citrate.—50 g. of di-isotridecyl citrate are suspended in a small amount of water. A solution of 16 g. of the glucosamine base in water is added drop by drop thereto. After removing the water, the ester salt is dried in a vacuum.

(g) An emulsion is prepared by stirring vigorously 150 g. of a melamin resin obetained by condensing 6 moles of formaldehyde to 1 mole of melamin, 10 g. of magnesium chloride, 1 g. of dodecyl phenyl sulfonic acid, and 30 g. of an emulsion containing 12.5 cc. of acetyl tributyl citrate, 12.5 cc. of water, 5 g. of di-isotridecyl citrate, and 0.36 g. of sodium hydroxide in 1000 cc. of water in an emulsifying apparatus for 5 minutes.

Dyed taffeta weave lining of viscose rayon is impregnated with such an emulsion at room temperature on a three-roller padding mangle. 90% of the impregnated liquid are squeezed off. Subsequently, the lining is dried on a rack at 100° C. to a residual moisture content of 20% and curing of the melamin resin is effected at 155° C. for 5 minutes. Subsequently, the lining is rinsed with cold water, neutralized with ammonia, and dried on a pin tenter with lead.

In order to compare the emulsion obtained according to Example 1(g) as described hereinabove with an emulsion which does not contain citric acid esters according to the present invention but a commercially used emulsifier, the dyed taffeta weave lining of viscose rayon is impregnated with an emulsion, wherein the citrate emulsifier is replaced by the stearic acid polyethylene glycol ester containing 6 moles of ethylene oxide to 1 mole of fatty acid and sold under the trademark "Soromin SG" by Badische Anilin und Sodafabrik A.G. of Ludwigshafen, Germany.

(h) The emulsion is prepared by stirring vigorously: 150 g. of a melamin resin obtained by condensing 6 moles of formaldehyde with 1 mole of melamin, 10 g. of magnesium chloride, 1 g. of dodecyl phenyl sulfonic acid, and 30 g. of an emulsion containing 10 g. of the above mentioned stearic acid polyethylene glycol ester sold under the trademark "Soromin SG" in 1000 cc. of water in an emulsifying apparatus for 5 minutes.

The impregnation of the dyed taffeta weave lining of viscose rayon is carried out at room temperature on a three-roller padding mangle. 90% of the impregnated liquid are squeezed off. Subsequently, the lining is dried on a rack at 100° C. to a residual moisture content of 20% and curing of the melamin resin is effected at 155° C. for 5 minutes. Subsequently, the lining is rinsed with cold water, neutralized with ammonia, and dried on a pin tenter with lead.

The two impregnated dyed taffeta weave linings of viscose rayon according to Examples 1(g) and 1(h) are compared in the following tests as described in "Handbuch fuer Textilingenieure und Textilpraktiker" by Koch-Wagner, vol. IB, Part II, page 143, 1953:

A (1).—Decrease in swelling value in percent relating to the starting material. The values are the mean values of 3 measurements. Example 1(g)=39%. Example 1(h)=32%.

A (2).—Dry crease-resistance angle according to DIN 53,890 (German Industrial Standards). The values are the mean values of 10 measurements.

|  | Warp | | Weft | |
| --- | --- | --- | --- | --- |
|  | After 5 minutes | After 60 minutes | After 5 minutes | After 60 minutes |
| Example 1(g) | 87.0 | 109 | 72.5 | 92 |
| Example 1(h) | 52.6 | 66 | 49 | 60.5 |

A (3a).—Resistance to tearing under dry conditions according to DIN 53,857 (German Industrial Standards). The values are the mean values of 5 measurements.

|  | Warp | | Weft | |
| --- | --- | --- | --- | --- |
|  | P, kg. | D, percent | P, kg. | D, percent |
| Example 1(g) | 49.6 | 17.7 | 29.7 | 16.7 |
| Example 1(h) | 43.2 | 12.0 | 25.1 | 15.1 |

P indicates rupture load in kg.
D indicates expansion in percent.

A (3b).—Resistance to tearing under wet conditions according to DIN 53,857. The values are the mean values of 5 measurements.

|  | Warp | | Weft | |
| --- | --- | --- | --- | --- |
|  | P, kg. | D, percent | P, kg. | D, percent |
| Example 1(g) | 30.0 | 18.7 | 16.1 | 17.8 |
| Example 1(h) | 23.9 | 16.3 | 12.3 | 15.3 |

A (3c).—

|  | Relative wet strength | | Loss in wet strength | |
| --- | --- | --- | --- | --- |
|  | $\dfrac{P\ \text{wet}}{P\ \text{dry}} \cdot 100\ [\%]$ | | $\dfrac{P\ \text{dry} - P\ \text{wet}}{P\ \text{dry}} \cdot 100\ [\%]$ | |
|  | Warp | Weft | Warp | Weft |
| Example 1(g) | 60.5 | 54.0 | 39.5 | 45.8 |
| Example 1(h) | 55.3 | 49.0 | 44.7 | 51.0 |

A (4).—Dry abrasion resistance as described in "Handbuch für Textilingenieure and Textilpraktiker" by Koch-Wagner, vol. IB, part II, pages 126–132, determined on the Schopper apparatus. The values are the mean values of 4 measurements. Test samples: 100 sq. cm.; test area: about 50 sq. cm.; load 100 g., initial stress 5 mm. camber height; scouring agent: carborundum paper of the grain size No. 400 (fine); change of direction of rotation, removal of the fiber dust by brushing off, and determination of fiber loss after every 100 rotations. Scouring was effected with a cloth support (1 sq. m., weight: 460 g.). A new abrasive paper was used for every sample and after every 500 rotations designated in the following table as Rev.

TABLE I

| | Initial weight, g. | Decrease and weight/100 sq. cm. after— | | | | | | | | | | | | | First visible damage after about— |
|---|---|---|---|---|---|---|---|---|---|---|---|---|---|---|---|
| | | 100 Rev. | | 200 Rev. | | 300 Rev. | | 400 Rev. | | 500 Rev. | | 600 Rev. | | 700 Rev. | |
| | | Mg. | Percent | Mg. | Percent | Mg. | Percent | Mg. | Percent | Mg. | Percent | Mg. | Percent | Mg. | Percent | |
| Example 1(h): | | | | | | | | | | | | | | | | |
| (a) | 0.8765 | 15.0 | 1.71 | 26.0 | 2.97 | 37.6 | 4.29 | 53.8 | 6.14 | | | | | | | 400 Rev. |
| (b) | 0.8716 | 16.0 | 1.84 | 30.0 | 3.44 | 49.2 | 5.64 | 68.0 | 7.80 | | | | | | | 200 Rev. |
| (c) | 0.8752 | 13.4 | 1.53 | 26.8 | 3.06 | 39.0 | 4.45 | 56.4 | 6.44 | | | | | | | 200 Rev. |
| (d) | 0.8766 | 14.0 | 1.60 | 26.0 | 2.97 | 40.4 | 4.61 | 58.6 | 6.68 | | | | | | | 300 Rev. |
| M | 0.8750 | 14.6 | 1.67 | 27.2 | 3.11 | 41.6 | 4.75 | 59.2 | 6.77 | | | | | | | |
| Example 1(g): | | | | | | | | | | | | | | | | |
| (a) | 0.8656 | 8.0 | 0.92 | 17.4 | 2.01 | 25.2 | 2.91 | 34.0 | 3.93 | 42.6 | 4.92 | 59.6 | 6.88 | 70.0 | 8.09 | 700 Rev. |
| (b) | 0.8682 | 12.8 | 1.47 | 24.8 | 2.86 | 33.2 | 3.82 | 43.8 | 5.04 | | | | | | | 300 Rev. |
| (c) | 0.8746 | 10.4 | 1.19 | 19.2 | 2.20 | 28.6 | 3.27 | 41.0 | 4.69 | 51.2 | 5.85 | | | | | 400 Rev. |
| (d) | 0.8713 | 10.8 | 1.24 | 19.6 | 2.25 | 31.6 | 3.63 | 40.0 | 4.59 | 50.2 | 5.76 | | | | | 400 Rev. |
| M | 0.8699 | 10.4 | 1.20 | 20.2 | 2.32 | 29.6 | 3.40 | 39.6 | 4.55 | | | | | | | |

A (5).—The samples were placed in distilled water at a temperature of 20° C. for 5 minutes. Thereafter, the superficially adhering water was removed by means of blotting paper to a water content of 40%. Three samples each of the fabrics of Examples 1(g) and 1(h) were tested, as described on page 130 of the above mentioned "Handbuch fuer Textilingenieure und Textilpraktiker," on a Schopper testing device under the following conditions: size of sample: 100 sq. cm.; tested area: about 50 sq. cm.; load: 100 g.; initial stress: 5 mm. camber height; scouring agent: waterproof abrasive paper "Hermes" of the grain size No. 360 manufactured by Norddeutsche Schleifmittelindustre Christiansen & Co. of Hamburg-Lurup, Germany. A dry cloth support (weight per sq. m.: about 480 g.) was placed under each sample during scouring. A new abrasipe paper was used in each test. The first visible damage to the fabric was observed after the following number of rotations (mean values of several tests are given hereinafter): sample impregnated according to Example 1(g): 46.7; sample impregnated according to Example 1(h): 26.7.

The above given test results indicate that the properties of fabric impregnated with the citric acid esters according to the present invention, i.e. Example 1(g) were improved by the following percentage values over the fabrics according to Example 1(h) whereby said last mentioned fabrics are calculated as 100%:

(B1) Improvement of the decrease in swelling value:

Example 1(g), +21.9%.

(B2) Improvement of the crease-resistance angle:

Warp:
   After 5 minutes _____ +64.6
   After 60 minutes _____ +65.2

Weft:
   After 5 minutes _____ +48
   After 60 minutes _____ +52.1

Example 1(g) (percent):

(B3a) Improvement of the dry resistance to tearing:

Warp:
   P _____ +14.8
   D _____ +47.5

Weft:
   P _____ +18.3
   D _____ +17.3

Example 1(g) (percent):

(B3b) Improvement of the wet resistance to tearing:

Warp:
   P _____ +25.5
   D _____ +14.7

Weft:
   P _____ +30.9
   D _____ +16.3

Example 1(g) (percent):

(B3c) Improvement of the relative wet strength and the loss in wet strength:

Warp _____ +9.4
Weft _____ +10.5

Warp _____ −11.6
Weft _____ +10.2

(B4) Improvement in abrasion resistance:

At 100 rev.:
   Mg. _____ −28.8
   Percent _____ −28.2

At 200 rev.:
   Mg. _____ −26.7
   Percent _____ −25.4

At 300 rev.:
   Mg. _____ −28.85
   Percent _____ −28.4

At 400 rev.:
   Mg. _____ −33.1
   Percent _____ −31.4

Example 1(g) (percent):

(B5) According to the improved results calculated under B1 to B4 and expressed in percent of the wet abrasion values of the comparative tests, the following changes were determined: Example 1(g), +75% over Example 1(h).

*Example 2*

(a) Preparation of di-isononyl citrate.—192 g. (1 mole) of anhydrous citric acid and 288 g. (2 moles) of isononyl alcohol are heated under reflux at 160° C. in an oil bath for 6 hours. The reaction mixture is then poured into water and stirred. To de-emulsify the resulting emulsion, sodium chloride is added. After removing the water, the ester is dissolved in acetone, decolorizing carbon is added thereto, and the mixture is filtered. The acetone is distilled off in a vacuum. Di-isononyl citrate remains as residue in a yield of 85% of the theoretical yield.

Saponification number: 371 (theoretical value: 378). Acid number: 124 (theoretical value: 126).

Use of di-isononyl citrate as emulsifier (b) 1 g. of acetyl tri-iso-octyl citrate, 0.4 g. of di-isononyl citrate, 0.9 cc. of N/10 sodium hydroxide solution, and 200 cc. of water are emulsified by means of an emulsifying apparatus for three minutes. The resulting emulsion is stable for several days.

Production of the sodium salt of di-isononyl citrate 50 g. of di-isononyl citrate are suspended in a small amount of water, a concentrated solution of 9.45 g. of sodium bicarbonate in water is slowly added drop by drop. Shortly after removing the water, the ester salt is dried in a vacuum.

(c) 10 g. of acetyl tri-n-octyl citrate, 1 g. of di-isononyl citrate, and 2 g. of di-isotridecyl citrate are emulsified with 45 cc. of water by means of an emulsifying apparatus for 5 minutes. A stable citric acid ester emulsion results which can be stored for a prolonged period of time.

(d) 10 g. of tri-isopropyl citrate, 1 g. of the sodium salt of di-isotridecyl citrate, and 1 g. of di-isononyl citrate are emulsified with 50 cc. of water in an emulsifying apparatus for 5 minutes. A stable emulsion is obtained.

Example 3

(a) Preparation of di-isodecyl citrate.—192 g. (1 mole) of anhydrous citric acid and 158 g. (1 mole) of isodecyl alcohol are heated under reflux in an oil bath at 170° C. for 7 hours. The resulting crude ester is poured into water, and thoroughly washed with water. The water-insoluble ester is separated and dried in a vacuum at 100° C. Di-isodecyl citrate is a colorless oil and is obtained in a yield of 86% of the theoretical yield.

Saponification number: 355 (theoretical value: 356).

Use of di-isodecyl citrate as emulsifier (b) 50 g. of acetyl tributyl citrate, 9 g. of di-isodecyl citrate, 1 g. of the sodium salt of di-isodecyl citrate, and 50 cc. of water are emulsified in an emulsifying apparatus for three minutes. The emulsion is very stable and can be diluted with any amount of water without de-emulsification.

Production of the sodium salt of di-isodecyl citrate

To 50 g. of di-isodecyl citrate, suspended in a small amount of water, there is added drop by drop a concentrated solution of 4.25 g. of sodium hydroxide in water. After removing the water, the resulting ester salt is dried in a vacuum.

(c) 50 g. of tributyl citrate, 9 g. of di-isodecyl citrate, and 50 cc. of water are emulsified in an emulsifying apparatus for three minutes. The emulsion is stable for several days.

(d) 50 g. of tributyl citrate, 20 g. of di-isodecyl citrate, and 50 cc. of water are emulsified in an emulsifying apparatus. The concentrated emulsion can be diluted with any amount of water and is very stable.

(e) 50 g. of acetyl tributyl citrate, 20 g. of di-isodecyl citrate, and 50 cc. of water are emulsified in an emulsifying apparatus for three minutes. The emulsion is stable for several days.

(f) 50 g. of acetyl tributyl citrate, 9 g. of di-isodecyl citrate, 1 g. of the triethylamine salt of di-isodecyl citrate, and 50 cc. of water are emulsified in an emulsifying apparatus for three minutes. The concentrated emulsion can be diluted with any amount of water without de-emulsification and is very stable.

Preparation of the triethylamine salt of di-isodecyl citrate 50 g. of di-isodecyl citrate are suspended in a small amount of water and 11 g. of triethylamine are added drop by drop thereto. After removing the water, the ester salt is dried in a vacuum at 100° C.

(g) 50 g. of acetyl tributyl citrate, 9 g. of di-isodecyl citrate, 1 g. of the triethanolamine salt of di-isodecyl citrate, and 50 cc. of water are emulsified in an emulsifying apparatus for three minutes. The concentrated emulsion can be diluted with any amount of water without de-emulsification and is very stable.

Preparation of the triethanolamine salt of di-isodecyl citrate 50 g. of di-isodecyl citrate are suspended in a small amount of water and 16 g. of triethanolamine are slowly added while stirring. After removing the water, the resulting ester salt is dried in a vacuum at 100° C.

The emulsions of the citric acid esters obtained as described hereinabove can be used in finishing or processing textiles, as plasticizers for plastics, lacquers, as emulsifier for preparing emulsions and dispersions of synthetic resins, as finishing or processing agent for paper, cardboard, and for other purposes.

It is understood, of course, that the new citric acid esters according to the present invention are also capable of emulsifying other non-water-soluble or difficultly water-soluble substances such as fats, oils, hydrocarbons, and others. However, the emulsifying capacity of the new citric acid esters is especially noteworthy with respect to the emulsification of citric acid esters.

Example 4

An emulsion of linseed-oil in water is prepared with the sodium salt of di-isotridecyl citrate in the following manner:

30 parts of linseed-oil, 70 parts of water, and 0.2 part of di-isotridecyl citrate are emulsified in an emulsifying apparatus for three minutes. A stable emulsion is obtained.

Or:

30 parts of linseed-oil, 70 parts of water, and 0.2 part of the sodium salt of di-isotridecyl citrate are emulsified in an emulsifying apparatus for three minutes. A stable emulsion is obtained.

Example 5

An emulsion of olive oil in water is prepared with the sodium salt of di-isotridecyl citrate in the following manner:

70 parts of olive oil, 30 parts of water, and 0.1 part of the sodium salt of di-isotridecyl citrate are emulsified for three minutes. A stable emulsion is obtained.

Or:

30 parts of olive oil, 70 parts of water, and 0.05 part of the sodium salt of di-isotridecyl citrate are emulsified in an emulsifying apparatus for three minutes. A stable emulsion is obtained.

Example 6

An emulsion of a mineral oil (petroleum) in water is prepared with the sodium salt of di-isodecyl citrate in the following manner:

70 parts of mineral oil (petroleum), 30 parts of water, and 0.2 part of the sodium salt of di-isodecyl citrate are emulsified for three minutes. A stable emulsion is obtained.

In place of isotridecyl alcohol, isonyl alcohol, and isodecyl alcohol used in the preceding examples, there may be employed other branched alcohols having between nine carbon atoms and 18 carbon atoms in their molecule such as iso-hexadecylalcohol, iso-octadecylalcohol, 3,5-dimethyl heptanol-(4); 2,5-dimethyl heptanol-(4); 4,6-dimethyl heptanol-(1); 2,7-dimethyl octanol-(2); 2,6-dimethyl octanol-(1); 2,4,6-trimethyl octanol-(1); 2-ethyl-4,6-dimethyl octanol-(1); 2,4,6-trimethyl decanol-(1); 2,4,6,8-tetramethyl decanol-(1); 5-methyl octanol-(2); 3-ethyl nonanol-(2); iso-alcohols which contain α-methyl groups in their molecule as they are obtained in the synthetic manufacture of isobutanol and by the "Synthol" process according to F. Fischer and H. Tropsch.

In place of the sodium salts of said mono- or di-citric acid esters, there may also be prepared and used the potassium, ammonium, hydrazine, hydroxylamine, mono, di-, and tri-ethanolamine salts, or the salts with di- or polyamines such as diethyl triamine, triethyltetramine, triethylamine, diethylamine, methylglucamine, glucosamine.

The salts are prepared by reacting the new esters with the calculated amount of the base either in aqueous dispersion or in solution in an appropriate organic solvent and removing the water or solvent after salt formation.

Example 7

1 kg. of bleached sulfite cellulose was beaten in an impact beater to a concentration of 4% and was then pulped in an experimental pulp engine to a particle size of 60° S.R. The following emulsion was added to this paper pulp:

50 g. of acetyl tributyl citrate, 9 g. of di-isotridecyl citrate, 1 g. of the sodium salt of di-isotridecyl citrate, and 50 cc. of water. This mixture was circulated without grinding in a pulp engine for 15 minutes until the emulsion was homogeneously distributed therein. Papers produced from such a paper pulp are very soft and flexible.

A comparative test, wherein the paper pulp was treated in the same manner but without the addition of the softener emulsion yielded hard and stiff paper. The softened paper according to Example 7 is highly suitable as wrapping paper for foods and the like.

As stated hereinabove, emulsions of citric acid esters with higher branched alcohols as they are prepared according to the present invention are surprisingly stable and, in this respect, far superior to emulsions made with citric acid esters with higher straight chain alcohols and also with other emulsifiers. The following Table II shows the stability of emulsions according to the present invention and of emulsions with other emulsifiers. They were prepared by emulsifying 0.5 g. of the plasticizer acetyl tributyl citrate in 100 cc. of water with the addition of 0.2 g. of the respective emulsifier by means of an emulsifying mixer for three minutes.

while the citric acid esters with branched alcohols according to the present invention yield very stable emulsions with acetyl tributyl citrate.

Example 8.—Preparation of di-isohexadecyl citrate 270 g. (1.4 moles) of anhydrous citric acid and 242 g. (1 mole) of isohexadecanol are heated under reflux in an oil bath at a temperature of 170° C. for five hours to six hours. Thereafter, the reaction mixture is dissolved in acetic acid ethyl ester and the solution is repeatedly washed with water. After distilling off the acetic acid ethyl ester, di-isohexadecyl citrate is obtained in a yield of 90%.
Saponification number: 260 (theoretical value: 263).
Acid number: 84 (theoretical value: 87).

TABLE II

| Emulsifier | After standing for— | | | | |
|---|---|---|---|---|---|
| | 6 hours | 12 hours | 24 hours | 48 hours | 4 days |
| No emulsifier | Completely settled | | | | |
| Di-isononyl citrate | Stable | | Stable | Very small deposit | Very small deposit. |
| Sodium salt thereof | do | | do | do | Do. |
| Dilauryl citrate | Stable (some deposit) | | do | Completely settled | Completely settled. |
| Sodium salt thereof | do | | Stable (some deposit) | Partly settled | Partly settled. |
| Di-isotridecyl citrate | Very stable | | Very stable | Very stable | Very small deposit. |
| Sodium salt thereof | do | | do | do | Do. |
| Dicetyl citrate | Settled (emulsifier not soluble) | | Completely settled | | |
| Sodium salt thereof | do | | do | | |
| Dibutyl citrate | Starts to settle | | do | | |
| Sodium salt thereof | do | | do | | |
| Dioctyl citrate | | | | Some deposit | Completely settled. |
| Sodium salt thereof | Somewhat more stable | | | do | Do. |
| "Tegin" | Does not dissolve | | | | |
| "Tegin M" | Does not dissolve | | | | |
| "Tegazid" | Does not dissolve | | | | |
| "Texaphor" | Starts to settle | | Completely settled | | |
| "Stockolan NS 9" | do | | do | | |
| "Hostapen A" | do | | do | | |
| "Texapon F 35" | do | | do | | |
| "Cyclanon L" | do | | do | | |
| "Emulgator W" | do | | | Completely settled | |
| "Emulgator BRS" | do | | | do | |
| "Emulgator EF" | do | | | do | |

The known emulsifiers mentioned in the above given Table II are composed as follows:

"Tegin": glycerol monostearate;
"Tegin M": glycerol monostearate and distearate;
"Tegacid": glycerol monostearate, free stearic acid and Sapamine phosphate; (manufacturer of these three emulsifiers: Chemische Fabrik Goldschmidt A.G. of Essen, Germany);
"Texaphor": sedimentation preventing agent for the lacquer industry;
"Texapon F 35": mixture of an alkyl sulfate and an alkyl benzene sulfonate; (manufacturer of these two emulsifiers: Deutsche Hydrierwerke G.m.b.H.; of Duesseldorf, Germany);
"Stockolan NS 9": hydroxy ethylated alkyl phenol, manufactured by Stockhausen & Cie. of Kleefeld, Germany;
"Hostapen A": sodium salt of the condensation product of oleic acid with hydroxy ethane sulfonic acid, manufactured by Farbwerke Hoechst of Frankfurt am Main-Hoechst, Germany;
"Cyclanon L": fatty alcohol sulfonate, manufactured by Badische Anilin- und Sodafabrik A.G. of Ludwigshafen/Rhein, Germany;
"Emulgator W": aryl polyglycol ether, manufactured by Farbwerke Bayer of Leverkusen, Germany;
"Emulgator BRS": anion-active emulsifier;
"Emulgator EF": non-ionogenic emulsifier; (manufacturer of these two emulsifiers: Chemische Werke Huels A.G. of Marl, County of Recklinghausen, Germany).

These results show that the citric acid esters with branched alcohols according to the present invention are especially suitable for emulsifying plasticizers of the citric acid ester type which are insoluble in water and can be used only in the form of stable aqueous emulsions. Thus dicetyl citrate and dibutyl citrate or, respectively, their salts are unsuitable for emulsifying acetyl tributyl citrate Use of di-isohexadecyl citrate as emulsifier (a) 50 g. of acetyl tributyl citrate, 9 g. of di-isohexadecyl citrate, 1 g. of the sodium salt of di-isohexadecyl citrate, and 50 cc. of water are emulsified in an emulsifying apparatus for three minutes. The resulting concentrated emulsion is very stable and can be diluted with any desired amount of water without de-emulsification.

(b) 1 g. of acetyl tributyl citrate, 0.4 g. of the sodium salt of di-isohexadecyl citrate, and 200 cc. of water are emulsified in an emulsifying apparatus for three minutes. The emulsion is stable for several days.

Production of the sodium salt of di-isohexadecyl citrate 50 g. of di-isohexadecyl citrate are suspended in a small amount of water. A concentrated solution of 3.1 g. of sodium hydroxide in water is added drop by drop thereto. After removing the water, the ester salt is dried in a vacuum.

Example 9.—Preparation of di-iso-octadecyl citrate 192 g. (1 mole) of anhydrous citric acid and 540 g. (2 moles) of iso-octadecyl alcohol are heated under reflux in an oil bath at a temperature of 150–160° C. for five hours. Thereafter, the reaction mixture is dissolved in chloroform and the chloroform is repeatedly washed with water. Di-iso-octadecyl citrate is obtained in a yield of 85% after distilling off the chloroform.
Saponification number: 250 (theoretical value: 241).
Acid number: 75 (theoretical value: 80).

Use of di-iso-octadecyl citrate as emulsifier (a) 50 g. of acetyl tributyl citrate, 9 g. of di-iso-octadecyl citrate, 1 g. of the sodium salt of di-iso-octadecyl citrate, and 50 cc. of water are emulsified in an emulsifying apparatus for three minutes. The resulting emulsion is very stable and can be diluted with any desired amount of water without de-emulsification.

(b) 1 g. of acetyl tributyl citrate, 0.4 g. of the sodium salt of di-iso-octadecyl citrate, and 200 cc. of water are emulsified in an emulsifying apparatus for three minutes. The emulsion is stable for several days.

Production of the sodium salt of di-iso-octadecyl citrate 50 g. of di-iso-octadecyl citrate are suspended in a small amount of water. A concentrated solution of 2.8 g. of sodium hydroxide in water is added drop by drop thereto. After removing the water, the ester salt is dried in a vacuum.

Of course, many changes and variations in the method of preparing such compositions containing the new citric aced esters or their salts for emulsifying emulsifiable compounds, and the like, may be made by those skilled in the art in accordance with the principles set forth herein and in the claims annexed hereto.

We claim:
1. A stable aqueous emulsion consisting essentially of an emulsifiable citric acid ester selected from the group consisting of a trialkyl citrate and its acetylation product, said ester being emulsified in an aqueous medium and of an ester compound of citric acid selected from the group consisting of the mono-esters of citric acid with branched-chain alcohols with at least 9 carbon atoms, the di-esters of citric acid with branched-chain alcohols with at least 9 carbon atoms, their reaction products with inorganic salt-forming compounds selected from the group consisting of hydrazine, hydroxylamine, ammonia, and alkali metal hydroxides, and their rection products with organic salt-forming compounds selected from the group consisting of mono-, di-, and tri-ethanolamines, di-, and tri-(lower) alkylamines, methyl glucamine, and glucosamine, said ester compound acting as emulsifying and stabilizing agent in said emulsion.

2. The stable aqueous emusion of claim 1, wherein said ester compound is present in an amount between about 2% and about 50% of said emulsifiable citric acid ester.

3. A stable aqueous emulsion consisting essentially of an emulsifiable citric acid ester selected from the group consisting of a trialkyl citrate and its acetylation product, said ester being emulsified in an aqueous medium and, as emulsifying and stabilizing agent, an ester compound of citric acid selected from the group consisting of the mono-esters of citric acid with branched-chain alcohols with at least 9 carbons atoms, the di-esters of citric acid with branched-chain alcohols with at least 9 carbon atoms, and their reaction products with inorganic salt-forming compounds selected from the group consisting of hydrazine, hydroxylamine, ammonia, and alkali metal hydroxides, and organic salt forming compounds selected from the group consisting of tri-(lower) alkylamines, diethanolamine, tri-ethanolamine, methyl glucamine, and glucosamine, the amounts of said emulsifiable citric acid ester in said aqueous emulsion being at least about 1 part of said ester to about 0.55 part of water, the emulsifying ester compound being present in said emulsion in an amount between about 2% and about 50% of the emulsifiable citric acid ester, said emulsion being dilutable with water in any proportion without deemulsification.

4. The stable aqueous emulsion of claim 3, wherein the ester compound is present in an amount between about 5% and about 20% of the emulsifiable citric acid ester.

5. A stable aqueous emulsion consisting essentially of
about 50 g. of acetyl tributyl citrate,
about 9 g. of di-isotridecyl citrate,
about 1 g. of the sodium salt of di-isotridecyl citrate, and
about 50 g. of water.

6. A stable aqueous emulsion consisting essentially of
about 50 g. of tributyl citrate,
about 18 g. of di-isotridecyl citrate,
about 2 g. of the sodium salt of di-isotridecyl citrate, and
about 50 g. of water.

7. A stable aqueous emulsion consisting essentially of
about 50 g. of acetyl tri-n-octyl citrate,
about 5 g. of the sodium salt of di-isononyl citrate,
about 10 g. of di-isotridecyl citrate, and
about 225 g. of water.

8. A stable aqueous emulsion consisting essentially of
about 50 g. of acetyl tributyl citrate,
about 9 g. of di-isodecyl citrate,
about 1 g. of the sodium salt of di-isodecyl citrate, and
about 50 g. of water.

9. A stable aqueous emulsion consisting essentially of
about 50 g. of tributyl citrate,
about 20 g. of di-isodecyl citrate, and
about 50 g. of water.

10. A stable aqueous emulsion of an oil consisting essentially of an oil selected from the group consisting of a vegetable oil, an animal oil, and a mineral oil and of an ester compound of citric acid selected from the group consisting of the mono-esters of citric acid with branched-chain alcohols with at least 9 carbon atoms, the di-esters of citric acid with branched-chain alcohols with at least 9 carbon atoms, their reaction products with inorganic salt-forming compounds selected from the group consisting of hydrazine, hydroxylamine, ammonia, and akali metal hydroxides, and their reaction products with organic salt-forming compounds selected from the group consisting of mono-, di-, and tri-ethanolamines, di- and tri-(lower) alkylamines, methyl glucamine, and glucosamine, said ester compound acting an emulsifying and stabilizing agent in said emulsion.

11. A stable aqueous emulsion of linseed oil and the sodium salt of di-isotridecyl citrate as emulsifier and emulsion-stabilizing agent.

12. A stable aqueous emulsion of linseed oil and di-isotridecyl citrate as emulsifier and emulsion-stabilizing agent.

13. A stable aqueous emulsion of olive oil and the sodium salt of di-isotridecyl citrate as emulsifier and emulsion-stabilizing agent.

14. A stable aqueous emulsion of a mineral oil and the sodium salt of di-isodecyl citrate as emulsifier and emulsion-stabilizing agent.

References Cited

UNITED STATES PATENTS

| | | | |
|---|---|---|---|
| 2,197,269 | 4/1960 | Guillauden | 106—263 X |
| 2,518,678 | 8/1950 | Gooding et al. | 106—263 |
| 3,102,128 | 8/1963 | Hennig et al. | 260—484 |
| 2,910,441 | 10/1959 | Hyeden | 252—312 |
| 3,024,198 | 3/1962 | Harrington et al. | 252—312 |
| 2,528,136 | 10/1950 | Goldstein et al. | 252—356 |
| 2,944,030 | 7/1960 | Patton | 252—356 |
| 3,161,538 | 12/1964 | Azorlosa et al. | 117—139.5 |
| 3,166,436 | 1/1965 | Guest et al. | 117—139.5 |
| 3,051,674 | 8/1962 | Kress | 260—29.4 |
| 3,131,157 | 3/1964 | Hyman et al. | 260—29.4 |
| 2,762,270 | 9/1956 | Keim et al. | 162—158 |
| 2,957,797 | 10/1960 | Nakayama | 162—158 |

LEON D. ROSDOL, *Primary Examiner.*

M. LIEBMAIN, ALEXANDER H. BRODMERKEL,
*Examiners.*

J. B. EVANS, H. B. GUYNN, *Assistant Examiners.*